United States Patent [19]

Corwin et al.

[11] Patent Number: 5,471,900
[45] Date of Patent: Dec. 5, 1995

[54] METHOD FOR TURNING A WORKPIECE

[75] Inventors: George E. Corwin; James R. Hoffman, both of Cincinnati, Ohio

[73] Assignee: Cincinnati Milacron Inc., Cincinnati, Ohio

[21] Appl. No.: 232,971

[22] Filed: Apr. 25, 1994

[51] Int. Cl.⁶ .................................................. B23B 1/00
[52] U.S. Cl. .............................. 82/1.11; 82/129; 82/47; 451/400
[58] Field of Search .......................... 82/1.11, 129, 145, 82/165, 151, 155, 47; 451/43, 399, 400, 251; 279/6; 408/150, 151, 187, 199, 200; 142/55, 57; 409/219

[56] References Cited

U.S. PATENT DOCUMENTS

| | | | |
|---|---|---|---|
| 2,462,501 | 2/1949 | Hohwart et al. | 279/46 |
| 2,824,744 | 2/1958 | Peters | 279/2 |
| 3,583,108 | 6/1971 | Oishi et al. | 51/237 |
| 4,067,586 | 1/1978 | Morawski | 279/1 |
| 4,269,001 | 5/1981 | Bottomley | 51/237 |
| 5,207,135 | 5/1993 | Babuder et al. | 82/1.11 |
| 5,249,394 | 10/1993 | Griswold | 51/281 |

FOREIGN PATENT DOCUMENTS 1125420  8/1968  United Kingdom ............ B23B 31/02

*Primary Examiner*—Mark Rosenbaum
*Assistant Examiner*—Kenneth J. Dansen
*Attorney, Agent, or Firm*—Thomas M. Farrell

[57] ABSTRACT

In a two-axis turning machine, the cutting tool unit machines a first diameter of a workpiece portion of barstock extending from a main spindle chuck. A special subspindle chuck rotating in the same direction advances axially, grasps the workpiece as it is cut off from the barstock, and retracts. The barstock is fed through the first chuck for subsequent first operation machining and located against a stop which is independent of the tool slides. The subspindle chuck rotation is reversed, displacing the first-generated workpiece axis from the subspindle axis, and a second diameter, eccentric to the first diameter, is formed by the cutting tool unit in a second operation.

4 Claims, 4 Drawing Sheets

METHOD FOR TURNING A WORKPIECE

FIELD OF THE INVENTION

The invention relates generally to multi-spindle bar feed turning machines, particularly those for performing first and second operations about two different axes.

BACKGROUND OF THE INVENTION

In turning machines, a chuck body is usually mounted to a rotatable spindle, and the chuck body includes means for grasping a workpiece for rotation. The chuck and workpiece are then rotated in unison to perform a machining operation, and the workpiece is cut by a single point tool.

In bar feed turning machines, a length of raw bar stock extends from behind the head stock, through the headstock spindle and chuck, and out of the chuck face into the machining zone. The cutting tools machine a workpiece portion in the machining zone, and a cut-off tool then severs the workpiece portion to form a discrete, separated workpiece. Most often, the workpiece is thus considered finished and is removed from the machine at this point. Next, an increment of bar stock is fed out of the chuck face, the work is reclamped, and the machining operation is repeated. The bar stock may be fed by a stock pusher at the rear of the headstock, and it is usually necessary to provide an end stop in the machining zone, against which the stock can be pressed, in order to establish the proper length extending from the chuck face for machining. In a single spindle, two-axis turning machine, where a tool turret is supported on coordinately movable stacked X and Z slides, the X slide being movable radially of the workpiece and the Z slide being movable axially of the workpiece, the tool turret slides are used to end stop the bar stock. Generally, this function does not detract appreciably from the cycle time and the cutting tool can get back to work promptly after the stock length has been set. In machines having a main spindle and a subspindle, coaxially opposed to one another, for performing first and second operations on a workpiece (i.e., operations on both ends), the use of the tool slides for end stopping bar stock will substantially detract from the cycle time, since the tool turret should be sent to the subspindle area to perform the second operation, as the main spindle bar stock is fed outwardly.

In some instances, it is necessary to machine a second diameter on a workpiece, not concentric with a first machined diameter. The workpiece is usually taken to a second machine and then clamped in a rotary chuck or fixture which is adapted for supporting the primary axis off the axis of rotation, so that the part may be rotated about the axis of rotation and subsequently machined, producing the eccentric diameter.

The present invention obviates many of the difficulties inherent in the prior art, and has resulted in an improved method for turning a workpiece which permits a two-axis multi-spindle bar feed turning machine to produce a workpiece having eccentric diameters, in an efficient manner.

SUMMARY OF THE INVENTION

It is an object of the present invention to provide a simplified method for efficiently turning eccentric workpiece diameters on a two-axis, multi-spindle bar feed machine, by accomplishing a radial shift of a chucked workpiece without need for unclamping and re-clamping the workpiece relative to the chuck, by means of inertial forces, and without need for end-stopping bar stock against the tool slide.

The invention is shown embodied in a method for turning workpieces in a two-axis, multi-spindle, bar feed turning machine, comprising the following steps:

(a) supporting a cutting tool unit on an X-slide and a Z-slide, movable radially and axially, respectively, with respect to a spindle axis;

(b) supporting a bar in a rotatable first chuck mounted to a first spindle, and permitting a workpiece portion of the bar to extend into a machining zone;

(c) rotating the bar with the first chuck in a first direction about the spindle axis;

(d) performing a first machining operation on the workpiece portion with the cutting tool unit to create a first diameter about a first workpiece axis which is coincident with said spindle axis;

(e) supporting a second chuck on a coextensively with and oppositely disposed to the first spindle;

(f) rotating the second chuck in the first direction about said spindle axis;

(g) advancing the second chuck towards the first chuck and grasping the workpiece portion;

(h) cutting off the workpiece portion from the bar to create a discrete workpiece;

(i) retracting the second chuck with the workpiece;

(j) feeding the bar through the first chuck to a predetermined stopping point;

(k) reversing rotation of the second spindle and second chuck, about said spindle axis thereby displacing the first workpiece axis from said spindle axis of the second spindle; and (l) performing a second machining operation on the workpiece with the cutting tool unit to create a second diameter about a second workpiece axis displaced from the first workpiece axis.

DESCRIPTION OF THE INVENTION

FIGS. 1–7 depict a special chuck which is the subject of a copending application, entitled Chuck With Inertially Shifted Workpiece, Ser. No. 08/232,973, filed Apr. 25, 1994, of Russell W. Jones, assigned to Cincinnati Milacron Inc., assignee of this invention.

Figure 1:
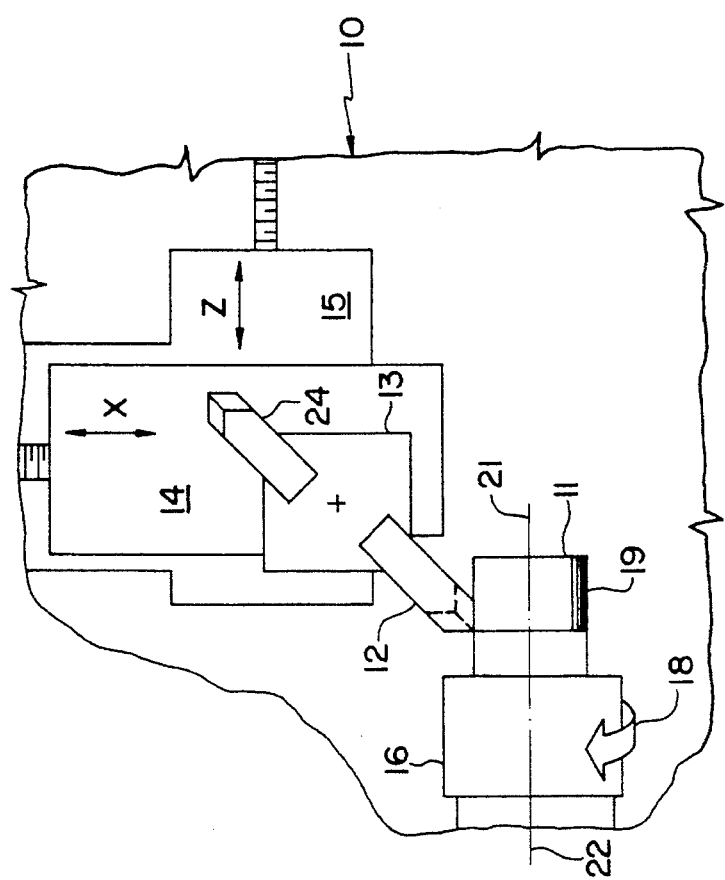
FIG. 1 is a plan view of a turning machine having one spindle.

Referring to the drawings, FIG. 1 is a plan view of a two axis turning machine 10 for performing turning operations on a workpiece 11. In such operations, a cutting tool 12 is advanced against a rotating workpiece 11. A tool turret 13 is supported on coordinately movable X and Z slides 14,15, the X slide 14 being movable radially of the workpiece 11 and the Z slide 15 being movable axially of the workpiece 11. When a workholding chuck 16, mounted to the machine spindle 17, supports and drives the workpiece 11 in a single rotary direction indicated by the broad arrow 18, a first workpiece diameter 19 is generated, and additional, concentric work diameters (not shown) are easily produced. Here it should be noted that many conventional chucking devices are suitable for workpieces having only concentric diameters. In the case of the workpiece 11 shown in FIG. 1, however, it is desired that the machine 10 produce a second diameter 20 (see FIG. 2), eccentric to the first diameter 19, during the subsequent machining operation.

Figure 2:
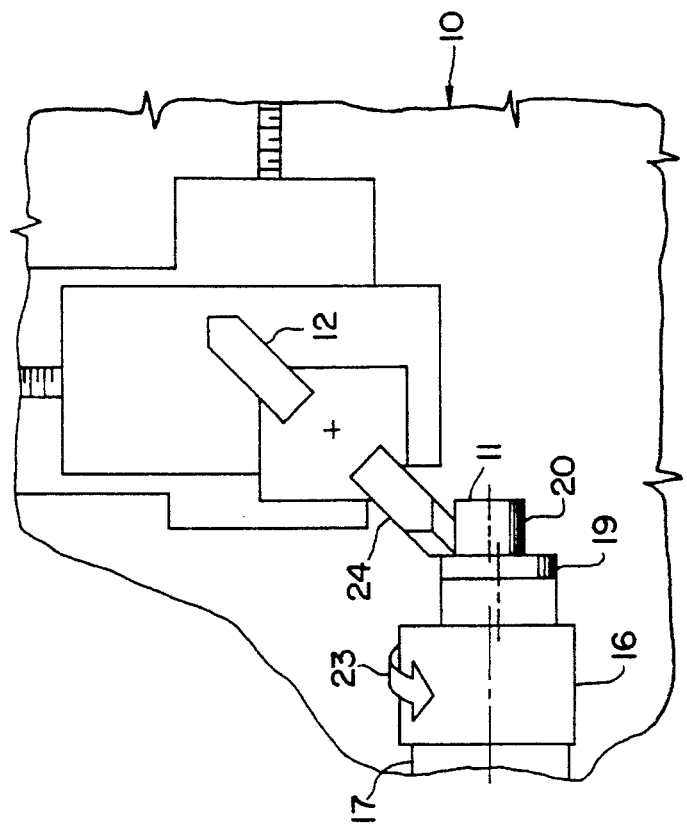
FIG. 2 is a plan view of the turning machine of FIG. 1, with the spindle rotating in the opposite direction.
Figure 4:
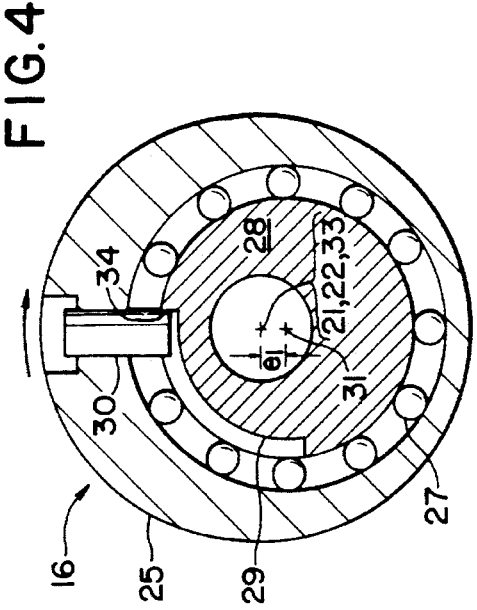
FIG. 4 is a cross-sectional view taken along the line 4—4 of FIG. 3.
Figure 3:
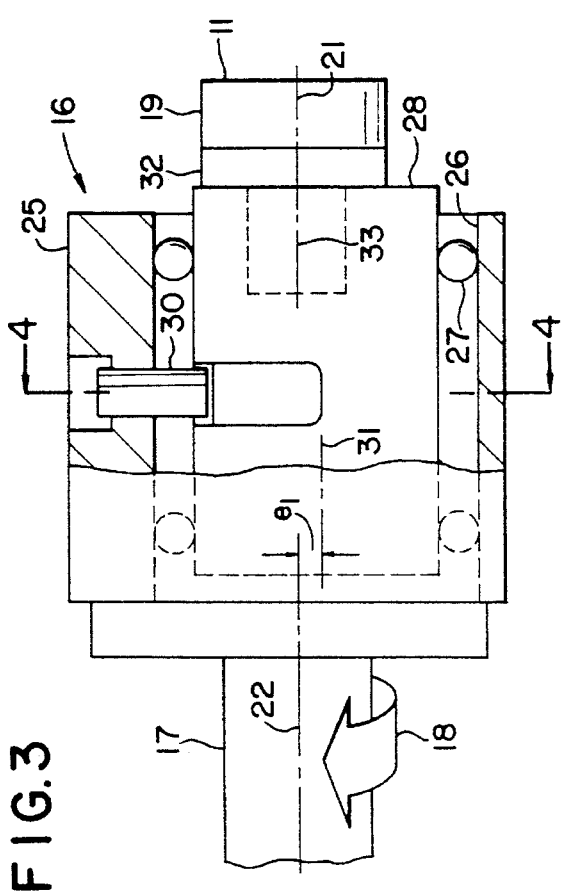
FIG. 3 is a simplified view, in partial section, of the chuck used in the machine of FIG. 1.
Figure 5:
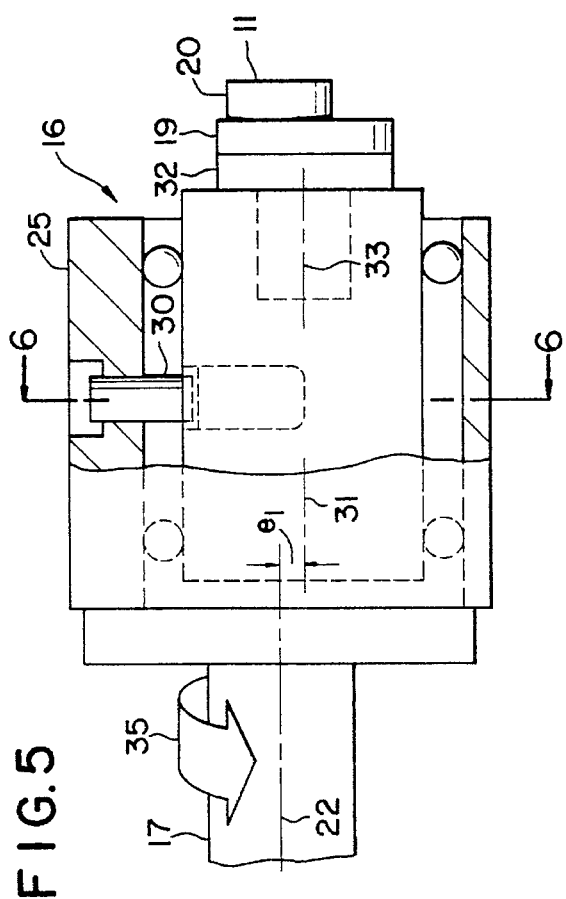
FIG. 5 is a side view, in partial section, of the chuck of FIG. 3, having its inner parts relatively rotated with respect to the chuck body.

In order to accomplish a shift of the workpiece main axis 21 relative to the rotary axis 22 of the machine spindle 17, the chuck 16 is simply rotated in the opposite direction, indicated by the broad arrow 23 of FIG. 2. Those having ordinary skill in the turning art will, of course, appreciate that the tool 24 for performing the subsequent turning operation must have its cutting edge correctly oriented with the reversely-rotating workpiece 11 for proper cutting action. FIGS. 3–5 depict a preferred embodiment and illustrate, in simplified form, principles of this special chuck 16.

In FIG. 3, the chuck 16 has a chuck body 25 mounted to the machine spindle 17 for rotation therewith about the spindle axis 22, i.e. the spindle axis 22 is the body axis of rotation. The chuck body 25 is machined with a central bore 26 eccentric to the spindle axis 22, and suitable antifriction bearings 27, preferably ball bearings, are fitted within the bore 26 to freely and rotatably support a cam unit 28.

With reference also to FIG. 4, the cam unit 28 has a slot 29 machined about its periphery, through a predetermined arc, and a pin 30 affixed to the chuck body 25, is radially inserted into the slot 29. The pin 30 comprises a stop means for limiting the reverse rotary movement of the cam unit 28 with respect to the chuck body 25; arcuate movement in this example is 90°. The radial pin 30 is located between the bearings 27 along the length of the cam unit 28. The cam unit has a first axis 31, established by the ball bearings 27, which is displaced from the spindle axis 22 by the eccentricity $e_1$. The cam unit 28 is fitted with an offset chuck means 32, which may be any of a variety of well-known devices for holding a workpiece; for example, collet chuck, diaphragm chuck, etc. In the design of FIG. 3, the chuck means 32 is mounted to the cam unit 28 about a second cam unit axis 33, coaxially with the spindle axis 22, so that a first diameter 19 may be processed concentrically with the spindle axis 22. It should be noted, though, that further embodiments of the invention may find it useful to displace the chuck means 32 and second cam unit axis 33 from the spindle axis 22, and such an application will be discussed further in connection with FIGS. 8 and 9. Referring still to FIGS. 3 and 4, it can be seen that when the spindle 17 drives the chuck body 25 in the direction shown, the chuck body 25 and cam unit 28 will rotate in unison about the spindle axis 22 due to engagement of the radial pin 30 with the end 34 of the slot 29.

Figure 6:
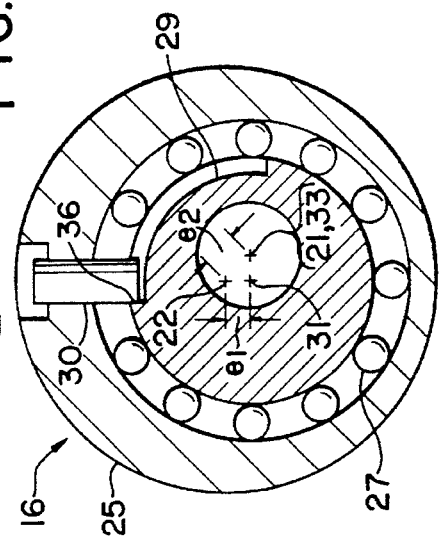
FIG. 6 is a cross-sectional view taken along the line 6—6 of FIG. 5.

Now, with reference to FIGS. 5 and 6, when the direction of spindle rotation is reversed, the chuck body 25 and its radial pin 30 will, of course, move in the direction of the broad arrow 35 of FIG. 5, but, due to the inertia of the cam unit 28, chuck means 32, and workpiece 11, the cam unit 28 will not immediately follow the reversal of movement; i.e., there is some lost motion, and the relative free movement between the chuck body 25 and cam unit 28 will cause the radial stop pin 30 to engage the other end 36 of the arcuate slot 29. At such time, the chuck body 25 and cam unit 28 will rotate in unison in the direction 35 shown in FIGS. 5 and 6. This relative free rotation between the cam unit 28 and chuck body 25 will cause the axis 21 of the first processed diameter 22 to move off-center relative to the spindle axis 22 (i.e., the chuck body axis). Thereafter, as a second diameter 20 is processed about the chuck body and spindle axis 22, the resulting workpiece will have displaced first and second diameters 19,20 of eccentricity $e_2$.

Figure 7:
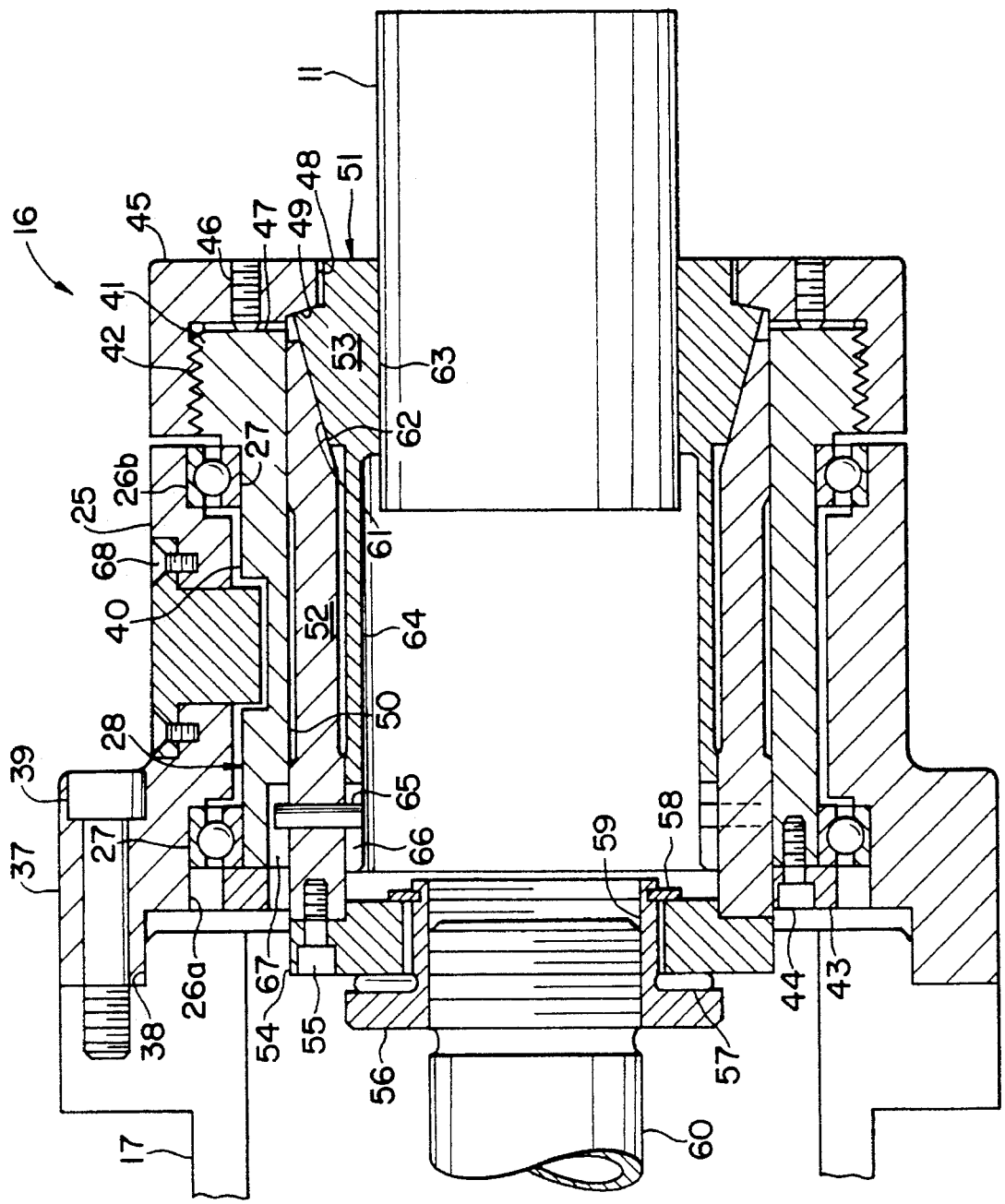
FIG. 7 is a cross-section through the chuck of FIG. 1, illustrating details of construction.

Referring to FIG. 7, more specific details of construction are shown, where the chuck body 25 has a flange 37 and is mounted to a pilot diameter 38 of the spindle 17. Screws 39 passing through the flange 37 secure the chuck body 25 to the spindle 17. A pair of ball bearings 27 mounted in opposite end bores 26a,b in the chuck body 25 serve to support the cam unit 28. The cam unit 28 has a bearing diameter 40, and a front flange 41 which is threaded about its outer diameter 42. A bearing retainer cap 43 is affixed by screws 44 to the rear of the cam unit 28, for locking the cam unit 28 into the bearings 27. The front end of the cam unit 28 is fitted with a threadably received cap 45 which is adjustably positioned with respect to the cam unit 28 by means of set screws 46 passing through the face of the cap 45 and into flange slots 47. The cap 45 has a clearance bore 48 and is back-faced with a spherical seat 49.

The central bore 50 of the cam unit 28 receives a collet assembly 51, having first and second collet parts 52, 53. The first collet part 52 is slidably received within the cam unit bore 50, and has a rear cap 54 affixed thereto. The rear cap 54 is mounted around the hub 55 of a flanged bearing member 56, wherein the cap 54 is constrained from relative axial movement between a thrust bearing 57 and a retainer ring 58. The hub 55 has a threaded bore 59 which receives a threaded drawbar 60. The drawbar 60 is actuated for axial movement by power means (not shown). The second collet part 53 comprises a split rearwardly-converging conical head 61 received in a mating conical bore 62 of the first collet part 52, so that as relative axial movement occurs between the first and second collet parts 52, 53, the head 61 will be deflected radially, in the well-known split collet manner, to grasp a workpiece 11. The second collet part 53 has a central bore 63 sized to receive the workpiece 11. The head 61 is shouldered against the spherical seat 41 of the front cap 45, so that forwardly thrusting movement (i.e., to the right of FIG. 7) of the first collet part 52 will cause only radial movement of the head 61. The second collet part 53 also has a tubular cylindrical portion 64 extending to the rear of the first collet part 52. A pin 65 extends through the wall of the first collet part 52, near the rear, into first and second axial slots 66, 67 formed within the cam unit 28 and second collet part 53, respectively, so that the cam unit 28 and collet assembly 51 will rotate in unison, yet permit relative axial movement of the first collet part 52. The end cap 54 of the first collet part 52 has a clearance bore to permit some radial motion to occur as the cam unit 28 throws the workpiece 11 in displacing its axis. The radial stop pin 30 is formed as a wide block secured by a pair of screws 68, and extends into a wide arcuate slot 29 (ref. FIG. 4) machined into the cam unit 28.

FIGS. 8a–d are sequential plan views.

Figure 8A:
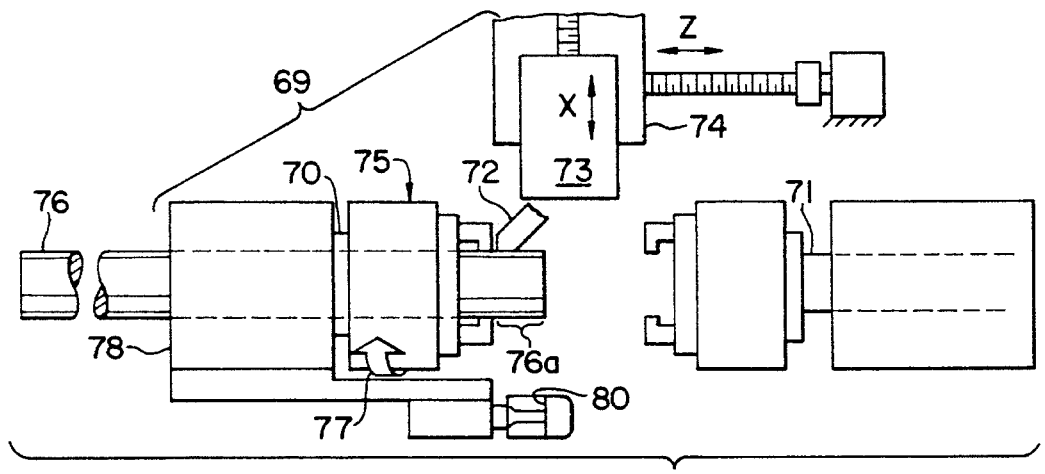
FIG. 8a–d are sequential plan views of a two-axis, bar feed turning machine having a main spindle and a sub-spindle.

FIG. 8a depicts a two axis bar feed turning machine 69 having a main spindle 70 and an extendible subspindle 71, coaxially opposed to one another, for performing first and second operations on a workpiece, i.e., operations on both ends. In machines of this type, a cutting tool 72 is supported on coordinately movable X and Z slides 73,74; the cutting tool 72 is movable in both an X direction, radially of the workpiece, and a Z direction, axially of the workpiece. A first chuck 75 mounted to the main spindle 70 supports and drives a bar 76 in a first rotary direction indicated by the broad arrow 77. The first chuck 75 may be any of a variety of well-known chucks which can be power-actuated to grasp and release the bar 76, and permit the bar 76 to pass through. The bar 76 extends from behind the headstock 78, through the headstock spindle 70 and chuck 75, and out of the chuck face into the machining zone. The cutting tool 72 machines a workpiece portion 76a in the machining zone, and a cut-off tool 79 (FIG. 8b) then severs the workpiece portion 76a. When the chuck grip is relaxed, the bar 76 is fed forward by a stock pusher (not shown) at the rear of the headstock 78, against an end stop 80 in the machining zone. The end stop 80 is mounted to the headstock 78 and is pivotal between a retracted, out-of-use position (shown) and an advanced, end-stopping position (see FIG. 8d).

Figure 8B:
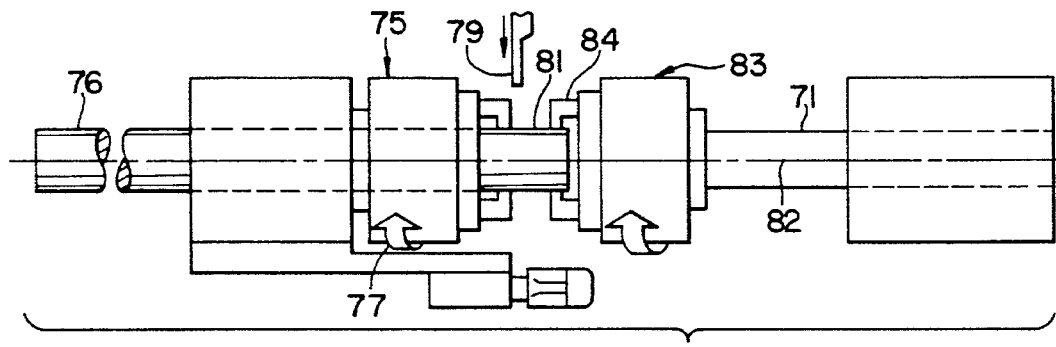

Referring next to FIG. 8b, after a first diameter 81 is produced about the common spindle axis 82, the subspindle 71 is moved axially towards the workpiece portion 76a while its subspindle chuck 83 is rotating in the same direction as the first chuck 75; the subspindle chuck 83 (a mirror image of the chuck of FIG. 1) is constructed in accordance with the principles of FIGS. 3 and 4, so as to rotate the subspindle chuck grippers 84 concentrically with the common spindle axis 82. The subspindle chuck 83 grasps the workpiece portion 76a while it is still rotating, and a cut-off tool 79 severs the workpiece portion 76a to form a discrete, separated workpiece 85 (see FIG. 8c).

Figure 8C:
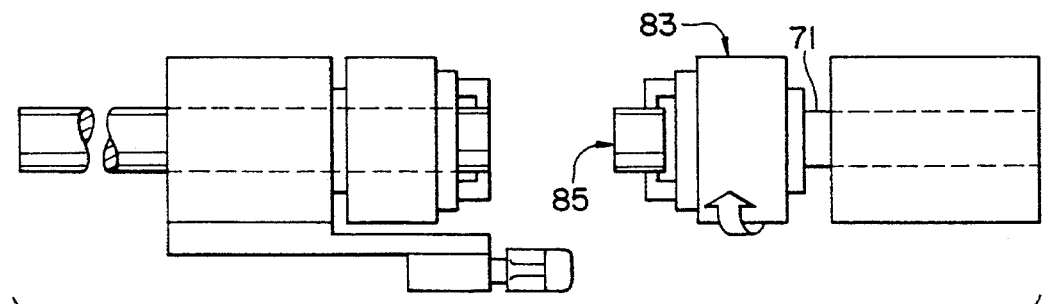

As shown in FIG. 8c, the subspindle 71 then retracts to its home position with the workpiece 85 in preparation for the second operation.

Figure 8D:
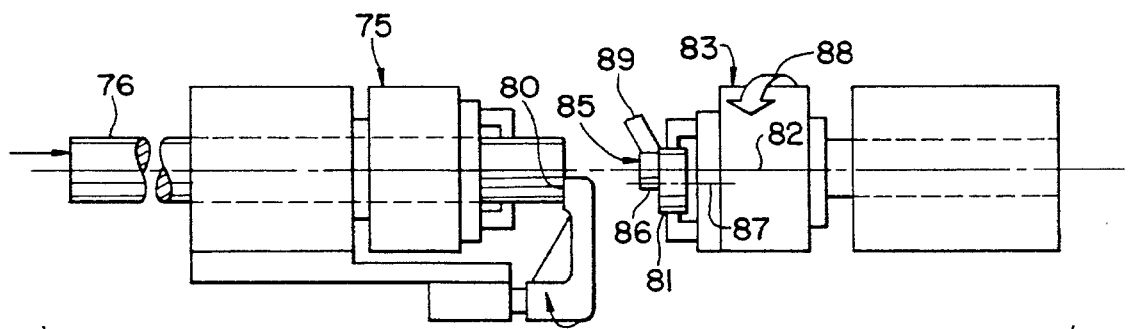

Finally, with reference to FIG. 8d, it is desired that the second machining operation produce a second diameter 86 eccentric to the first diameter 81. In order to accomplish a shift of the workpiece main axis 87 relative to the common spindle axis 82, the subspindle chuck 83 is simply rotated in the opposite direction, indicated by the broad arrow 88, in accordance with the principles shown in FIGS. 5 and 6. Those having ordinary skill in the turning art will, of course, appreciate that the tool 89 for performing the subspindle second turning operation must have its cutting edge correctly oriented with the reversely-rotating workpiece 85 for proper cutting action. While the second operation is in progress, the end stop 80 may be swung to its advanced position for setting the bar 76 which is fed through the first chuck 75.

It will be appreciated by those skilled in the art that the invention is applicable to systems which grip workpieces on interior or exterior surfaces, and to systems which machine interior or exterior surfaces.

It will also be appreciated that the invention is applicable to systems which handle hollow or solid bar stock, of circular or non-circular cross-section.

While the invention has been shown in connection with a preferred embodiment, it is not intended that the invention be so limited; rather, the invention extends to all such designs and modifications as come within the scope of the appended claims.

What is claimed is:

1. A method for turning workpieces in a two-axis, multi-spindle, bar fed turning machine, comprising the following steps:

(a) supporting a cutting tool unit on an X-slide and a Z-slide, movable radially and axially, respectively, with respect to a spindle axis;

(b) supporting a bar in a rotatable first chuck mounted to a first spindle, and permitting a workpiece portion of said bar to extend into a machining zone;

(c) rotating said bar with said first chuck in a first direction about said spindle axis;

(d) performing a first machining operation on said workpiece portion with said cutting tool unit to create a first diameter about a first workpiece axis which is coincident with said spindle axis;

(e) supporting a second chuck on a second spindle coextensively with and oppositely disposed to said first spindle;

(f) rotating said second chuck in said first direction about said spindle axis;

(g) advancing said second chuck towards said first chuck and grasping said workpiece portion;

(h) cutting off said workpiece portion from said bar to create a discrete workpiece;

(i) retracting said second chuck with said workpiece;

(j) feeding said bar through said first chuck to a predetermined stopping point;

(k) reversing rotation of said second spindle and second chuck, about said spindle axis, thereby displacing said first workpiece axis from said spindle axis; and (l) performing a second machining operation on said workpiece with said cutting tool unit to create a second diameter about a second workpiece axis displaced from said first workpiece axis.

2. A method for turning workpieces according to claim 1, further comprising the following steps:

(m) removing said workpiece from said second chuck; and (n) repeating steps (b) through (l).

3. A method for turning workpieces according to claim 1, wherein step (j) further comprises feeding said bar through said first chuck and locating said bar against a stop which is independent of said X and Z slides.

4. A method for turning workpieces according to claim 3, further comprising the following steps:

(m) removing said workpiece from said second chuck; and (n) repeating steps (b) through (l).

\* \* \* \* \*